(12) United States Patent
Rodarte et al.

(10) Patent No.: US 7,469,809 B2
(45) Date of Patent: Dec. 30, 2008

(54) CARRIER FOR A PORTABLE DEVICE

(75) Inventors: Luis Ernesto Elizalde Rodarte, Durham, NC (US); Kevin Laverne Schultz, Raleigh, NC (US); Ronald Alan Smith, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 10/961,737

(22) Filed: Oct. 8, 2004

(65) Prior Publication Data

US 2006/0076381 A1    Apr. 13, 2006

(51) Int. Cl.
*A45F 5/00* (2006.01)
(52) U.S. Cl. ................ 224/578; 224/218; 224/264; 224/580; 224/930
(58) Field of Classification Search ............. 224/218, 224/258, 578, 580, 264, 930, 254, 257, 161, 224/158, 929
See application file for complete search history.

(56) References Cited

U.S. PATENT DOCUMENTS

| | | | | | |
|---|---|---|---|---|---|
| 3,081,923 | A | * | 3/1963 | Bagby | 224/149 |
| 3,522,766 | A | * | 8/1970 | Wolbarst | 396/32 |
| 3,938,166 | A | * | 2/1976 | Sloop | 396/423 |
| 4,328,917 | A | * | 5/1982 | Reeberg | 224/254 |
| 4,337,938 | A | * | 7/1982 | Rodriguez | 482/74 |
| 5,195,666 | A | * | 3/1993 | Yamaguchi et al. | 224/159 |
| 5,307,966 | A | * | 5/1994 | Inaba et al. | 224/578 |
| 5,540,365 | A | * | 7/1996 | LaMair | 224/158 |
| 5,615,811 | A | * | 4/1997 | Bell et al. | 224/150 |
| 6,163,450 | A | * | 12/2000 | Kim | 361/679 |
| 6,217,095 | B1 | * | 4/2001 | Yamada | 294/149 |
| 6,352,186 | B1 | * | 3/2002 | Endo | 224/254 |
| 6,550,108 | B2 | * | 4/2003 | Pratl | 24/3.13 |
| 6,622,899 | B1 | * | 9/2003 | Klindworth-Garron | 224/578 |
| 2002/0126217 | A1 | * | 9/2002 | Arakane et al. | 348/375 |
| 2003/0066856 | A1 | * | 4/2003 | Lehtonen | 224/675 |

FOREIGN PATENT DOCUMENTS

| | | | | |
|---|---|---|---|---|
| GB | 2339359 | A | * | 1/2000 |
| JP | 03211975 | A | * | 9/1991 |

* cited by examiner

*Primary Examiner*—Nathan J Newhouse
*Assistant Examiner*—Justin M Larson
(74) *Attorney, Agent, or Firm*—Rabin & Berdo, PC

(57) ABSTRACT

A carrier for a portable device having a shoulder strap having a padded region and a cord region. The padded region is adapted to rest on a superior portion of a person's shoulder. A shoulder strap catch is adapted to be coupled at an end thereof to a portable device; and the shoulder strap catch defines an opening through which the cord region of the shoulder strap is slidably retained. The portable device may be moved from a carry to a use position, along the shoulder strap, without dislodging the padded region. In addition or alternatively, the carrying apparatus is a hand strap coupled at a first end to side of a portable device at substantially a center portion thereof. The second end of the hand strap is removably coupled to a strap attachment bracket positioned proximate the opposite side of the portable device, and having a bracket attachment area that can be reversed to support a right or left-handed orientation.

14 Claims, 7 Drawing Sheets

CARRIER FOR A PORTABLE DEVICE

FIELD OF THE INVENTION

This invention relates to a carrying apparatus and method for a portable device, such as a shoulder strap and/or hand strap for a portable electronic device.

BACKGROUND INFORMATION

There are many portable devices, including particularly portable electronic devices, that may be carried or held by a user during active use of the device and/or during periods of non-use of the device. Such devices include but are not limited to hand-held computers, PDA's, tablet computers, photographic equipment and video equipment.

It may be desired, in some instances, to attach a shoulder strap to a portable device, to allow the user's shoulder to bear the weight of the device when it is not in use. Exemplary prior art shoulder straps for portable devices generally consist of a strap having a padded shoulder area that contacts the shoulder, with the strap being attached at each end thereof to attachment points on the portable device. A disadvantage associated with such straps is that when a user moves the device from a carrying position to a use position, the shoulder strap is caused to slide across the shoulder, moving the padded area from its optimal position and in some instances causing the strap to fall off of the shoulder.

It may also be desired, in some instances, to attach a hand strap to a portable device, to assist the user in holding the device for extended periods of time by reducing hand fatigue and to reduce the likelihood that the portable device may be dropped by the user. Exemplary prior art hand straps consist of a strap positioned over the underside of the device. Disadvantages associated with such straps include a lack of true right and left-handed universality, discomfort, and lack of security of the strap.

SUMMARY OF THE INVENTION

A carrier for a portable device disclosed herein. In an exemplary aspect of the invention, a shoulder strap is coupled to a portable device, in a manner permitting the portable device to travel along the shoulder strap without dislodging the shoulder strap from its preferred position on the shoulder of the user. In one embodiment, the shoulder strap has a padded area adapted to be positioned on top of a person's shoulder, adjustability sections coupled to each end of the padded area, and a cord coupled to the adjustability sections. The cord is passed through a strap catch attached to the portable device, and the strap catch is permitted to travel along the cord without dislodging the padded area from the shoulder.

In another exemplary aspect of the invention, a hand strap is attached to an underside of a portable device. At one end, the strap is preferably secured proximate the center of one of the sides of the device. At the second, opposite end, the strap is secured away from the center, so that the angle formed by the strap across the underside of the device approximates the alignment of the user's knuckles when the user's hand is in position under the strap. It is preferred that the second end of the strap is moveable from a first, right-handed position to a second, left-handed position.

In another exemplary aspect of the invention, each of a shoulder strap and a hand strap is provided.

BRIEF DESCRIPTION OF THE DRAWINGS

FIG. 8 is a side view illustrating a right-handed orientation of a hand strap on a portable device, and illustrates preferred positioning angles for the hand strap.

DETAILED DESCRIPTION OF THE PREFERRED EMBODIMENTS

Figure 1:
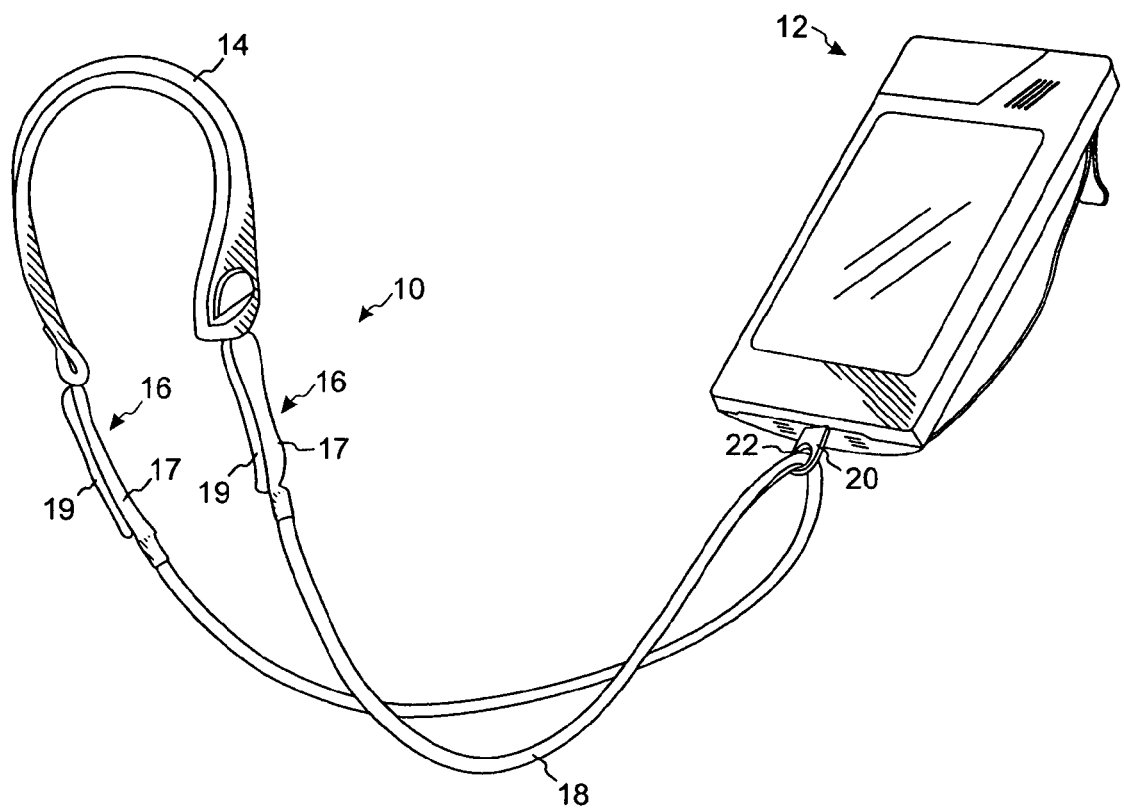
FIG. 1 is a perspective view of a carrying apparatus consistent with an embodiment of the present invention, illustrating the placement of both a shoulder strap and hand strap on a portable device.

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

The present invention is directed toward a carrying apparatus and method for a portable device. In embodiment, the carrying apparatus is a shoulder strap. In another embodiment, the carrying apparatus is a hand strap. In still another embodiment, both a shoulder strap and a hand strap are provided.

Referring first to FIGS. 1 and 2A-2C, reference is made to the shoulder strap 10 of the present invention, coupled to a portable device 12 via a strap catch 20. In one preferred embodiment, the shoulder strap 10 comprises a shoulder pad (or padded region) 14, two adjustability regions 16, and a cord (or cord region) 18. These elements, and operation of the shoulder strap 10, will now be described in further detail.

The shoulder pad 14 should be formed from a material that provides comfort, durability, and safety. Neoprene is a preferred material, though other materials suitable for use as a shoulder pad may also be utilized. It is preferred for the underside of the shoulder pad to have a rubberized grip or texture so that the shoulder pad will resist movement and tend to stay in position on a superior portion of the user's shoulder during wearing of the shoulder strap 10 and use of the portable device 12.

The adjustability regions 16 are preferably formed from webbing or the like. It is preferred that the adjustability regions 16 be lined on a first portion 17 with loop material (not shown), and on a second portion 19 with hook material (not shown), so that length of the adjustability regions 16 can be varied by changing the position of the first portion 17 relative to the second portion 19. (It should be noted that while two adjustability regions 16 are preferred, sufficient adjustability may be provided with a single adjustability region 16. Moreover, it may be desired to eliminate the adjustability region(s) 16 entirely and, for example, to instead provide a plurality of shoulder straps 10 in varying sizes.)

The cord 18 should be sufficiently strong to support the portable device 12 and should be capable of traveling through the strap catch 20 without binding. Preferably, the cord 18 should also be elastic, to help absorb shock if the portable device 12 accidentally slips from the user's hand. Bungee cord is a preferred material for the cord 18, though substitute materials may be provided.

The strap catch 20 is coupled to the portable device 12, and should have an opening 22 sufficiently large to permit the cord 18 to pass therethrough without binding. For improved binding resistance, it is preferred that the opening 22 be highly polished. It is further preferred that the strap catch 20 be rotatably coupled to the portable device 12 (as illustrated, for example, in FIGS. 1 and 6B), to allow for relatively free movement of the portable device relative to the cord 18. The base of the strap catch 20 may be attached to the portable device 12 through any desired means, and is preferably positioned proximate a center of a side of the portable device 12. Where the shoulder strap 10 is desired to be utilized with a portable device 12 that does not have a strap catch 20 thereon, it may be desired to couple the base of the strap catch 20 (or an adapter to be interposed between the strap catch 20 and portable device 12) to the portable device 12 using, for example, glue, screws, or other desired coupling means.

It should be noted that the portable device 12 as shown in FIG. 1 is an electronic device. The portable device 12 may be any desired portable electronic device, such as hand-held computer, PDA, tablet computer, photographic equipment or video equipment. The portable device 12 may also be a non-electronic device, such as a purse, hand-bag, clip-board, or other item that a user may need to variously carry (for example in a FIG. 2A position) and use (for example in a FIG. 2C position) without dislodging the shoulder pad 14.

Figure 2A:
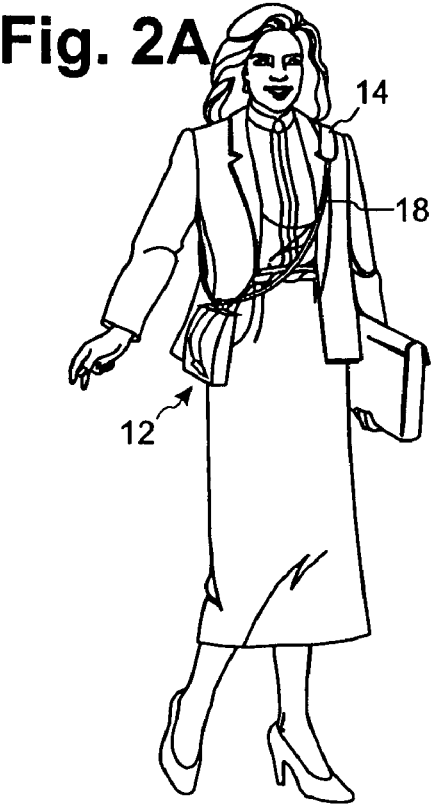
FIG. 2A is a front view of the carrying apparatus of FIG. 1 in use by a person, with the portable device in the carry position.
Figure 2B:
FIG. 2B is a continuation of the view shown in FIG. 2, with the portable device being moved from a carry position to a use position.
Figure 2C:
FIG. 2C is a continuation of the view shown in FIG. 2A, with the portable device being held in a use position.
Figure 3A:
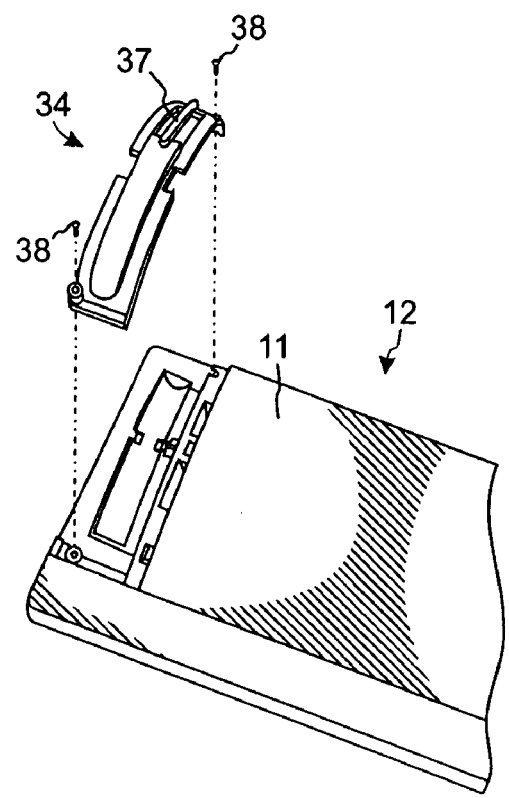
FIG. 3A is a perspective, exploded view illustrating coupling of a removable hand strap attachment bracket in a first orientation.
Figure 3B:
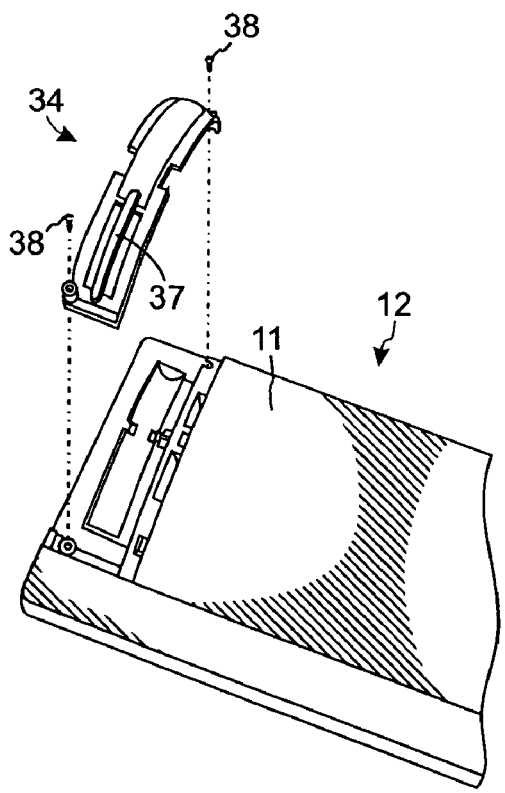
FIG. 3B is a perspective, exploded view illustrating coupling of a removable hand strap attachment bracket in a second orientation.
Figure 4A:
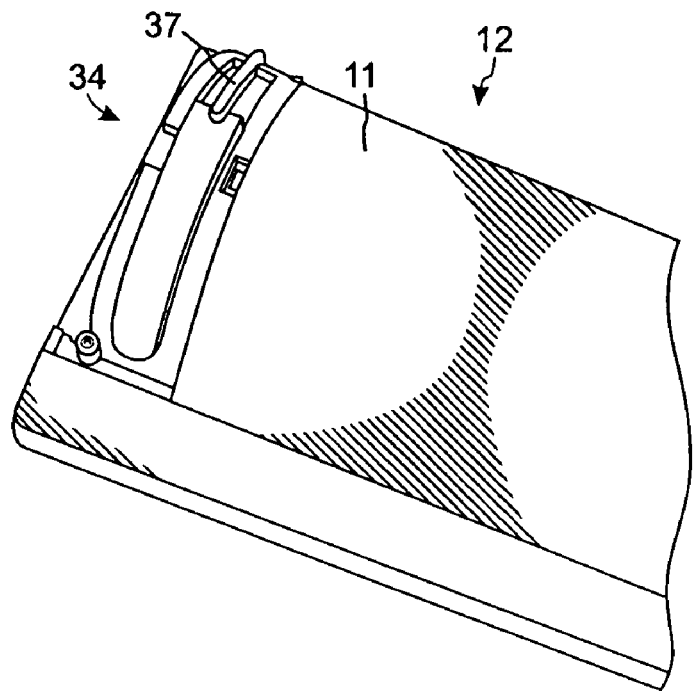
FIG. 4A is a perspective view illustrating a removable hand strap attachment bracket coupled to a portable device in a first orientation.
Figure 4B:
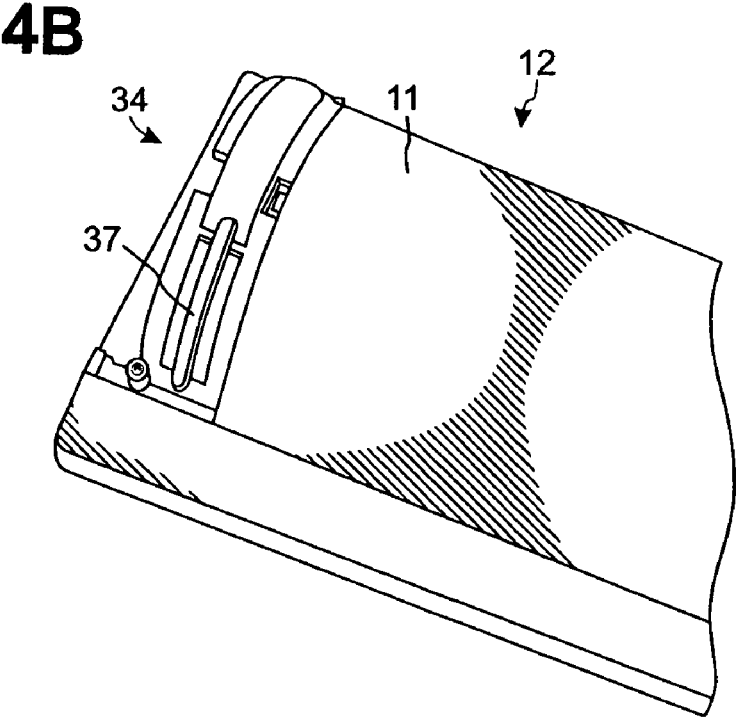
FIG. 4B is a perspective view illustrating a removable hand strap attachment bracket coupled to a portable device in a second orientation.

Referring specifically to FIGS. 2A-2C, it can be seen that movement of the portable device 12 from a carrying position (FIG. 2A), through an intermediate position (FIG. 2B), and to a use position (FIG. 2C) does not alter the position of the shoulder pad 14 relative to the user.

Referring now to FIGS. 3A-7B, reference is made to the hand strap assembly 30 of the present invention, coupled to a portable device 12. In one preferred embodiment, the hand strap assembly 30 comprises a strap (or hand strap) 32, a reversible strap attachment bracket 34, and a bracket cover 40. These elements, and operation of the hand strap assembly 30, will now be described in further detail.

Initially, as perhaps best seen in FIGS. 3A-5B, it should be noted that it is preferred that the underside 11 of the portable device 12, to which the hand strap assembly 30 is coupled, has a convex surface. This permits a more secure and comfortable grasping by the user of the portable device 12 under the hand strap 32. However, a hand strap assembly 30 coupled to a portable device 12 having a non-convex underside would still provide benefit to a user.

The strap 32 should be formed from a durable and comfortable material. Preferably, it is formed from neoprene, though other materials may be utilized. Preferably, a region of hook material 31 (see FIG. 6A) is provided on an underside of the strap, which mates with corresponding loop material (not shown) on an outside portion of the strap 32. This provides the strap 32 with a length adjustability feature, and also permits ready removal and re-attachment of the strap 32 for purposes of changing between a left and right-handed orientation as herein described.

A first end of the strap 32 is preferably coupled proximate a first side of the portable device 12. Preferably, the first end is coupled proximate the middle of the first side. This positioning facilitates the reversibility feature of the strap 32, as herein described.

The hand strap 32 should be removably coupled at a second end thereof to a second, opposite side of the portable device 12. Referring specifically to FIGS. 3A-4B, attention is particularly directed to the strap attachment bracket 34, to which the removable end 35 of the strap 32 is coupled. As shown in these figures, the strap attachment bracket 34 is reversible, so as to permit either a right-handed or left-handed coupling of the hand strap 32 to the portable device 12 by moving the attachment area 37 of the strap attachment bracket 34 to either the left or the right. As shown in these figures, in one embodiment, the strap attachment bracket 34 is secured using screws 38. Attachment could also be accomplished, for example, by plastic snap features or by placement of a secondary cover on top, as herein described.

Figure 5A:
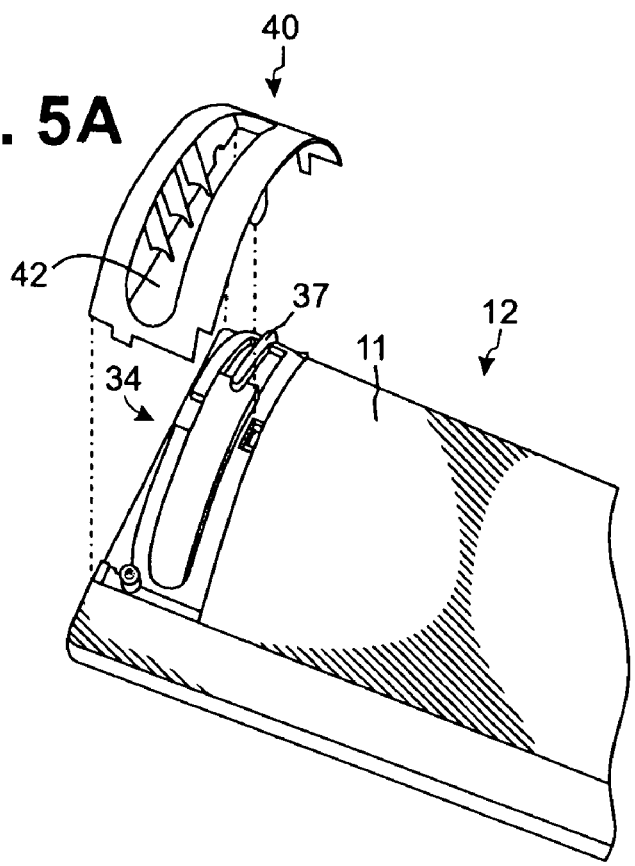
FIG. 5A is a perspective view illustrating coupling of a cover over a hand strap attachment bracket.
Figure 5B:
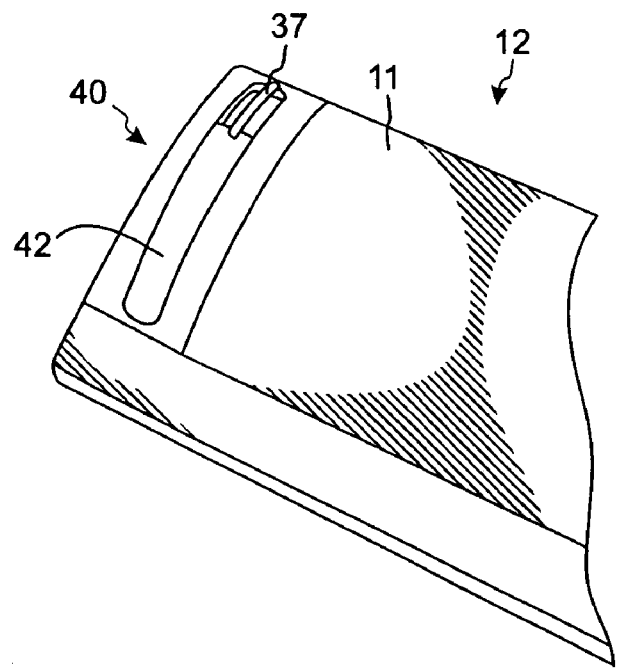
FIG. 5B is a perspective view illustrating a cover coupled over a hand strap attachment bracket.
Figure 6A:
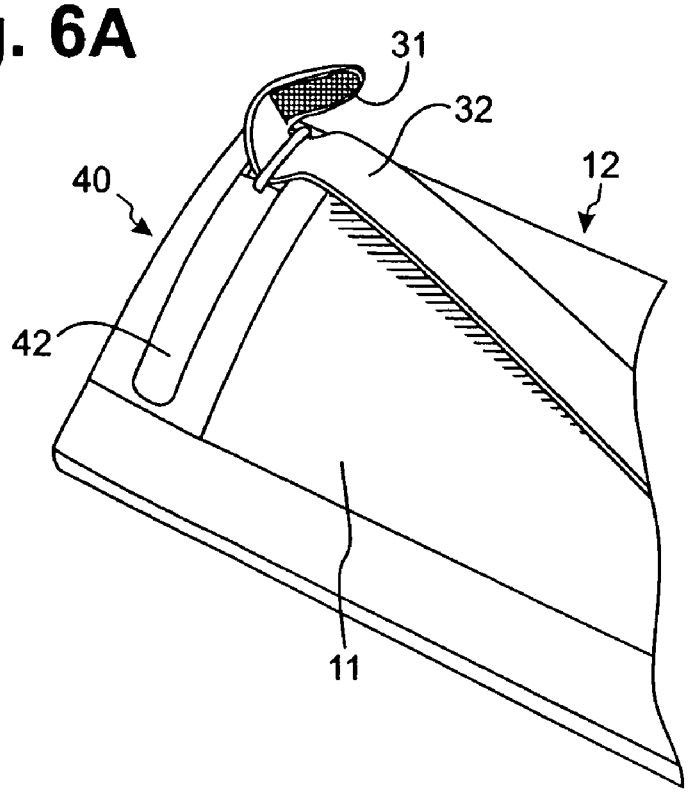
FIG. 6A is a perspective view illustrating coupling of a removable end of a hand strap to a hand strap attachment bracket.

Referring now to FIGS. 5A and 6A, it is preferred, in the interest of providing a more streamlined appearance, to conceal the screws 38 by providing a bracket cover 40. The bracket cover 40 snaps into position over the strap attachment bracket 34, after the strap attachment bracket 34 has been secured in the desired right or left-handed orientation. As can be seen in FIG. 5B, when in position, the screws 38 are concealed. The bracket cover 40 has an open area 42 thereacross, so that the attachment area 37 will be exposed to the user whether the strap attachment bracket 34 is in a right or left-handed orientation. As shown in FIG. 6A, actual coupling of the strap 32 to the attachment area 37 preferably occurs when the bracket 40 is in position. (It should be apparent that functionality of the hand strap 30 would not be impaired by elimination of the bracket 40.)

Figure 7A:
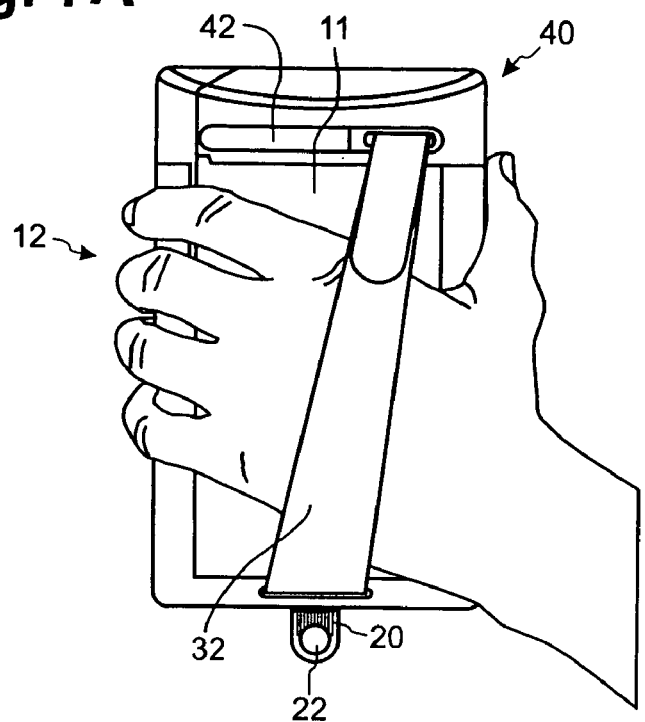
FIGS. 7A and 7B are side view views illustrating a left-handed orientation of a hand strap on a portable device.
Figure 7B:
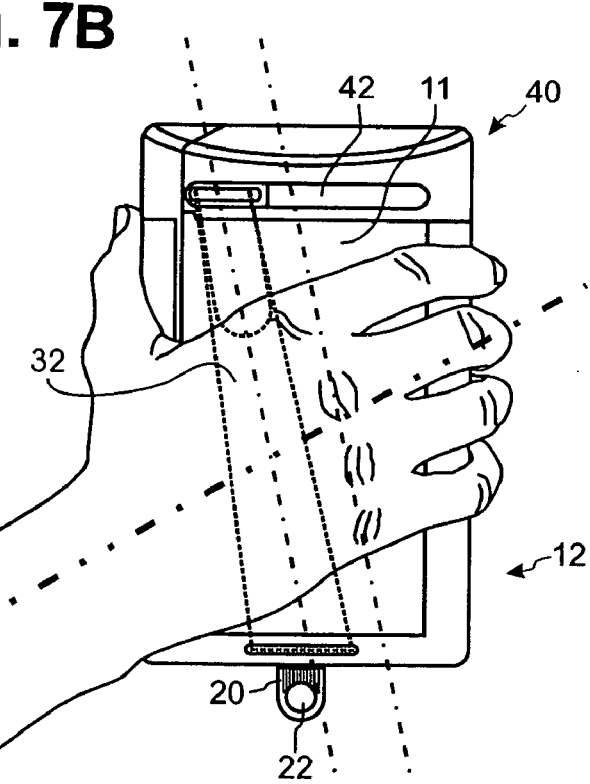

Referring now to FIGS. 7A-7B, alternate right and left-handed orientations of the strap 32 are shown, having been accomplished through a reversing of the strap attachment bracket 34 as herein described. With respect to the position of the attachment area 37 along the strap attachment bracket 34 and thus the strap 32, reference is made to FIG. 7B. It is preferred to provide a positioning whereby the strap 32 will cross over the top of a user's hand in a line that is substantially parallel to the user's knuckles. It is further preferred that the positioning of the strap 32 permit the user to maintain a relatively straight positioning of the wrist while grasping the portable device 12 using the strap 32, so as to reduce user fatigue.

Figure 6B:
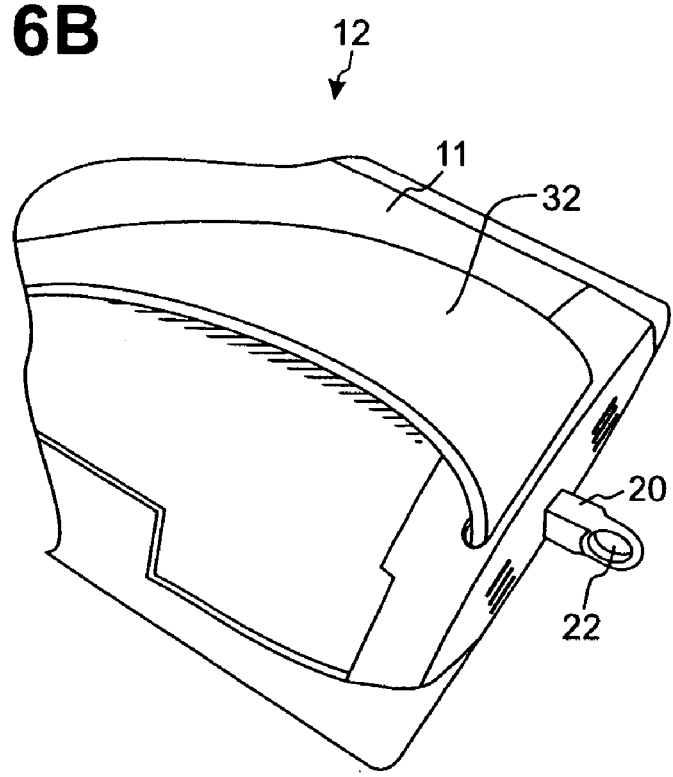
FIG. 6B is a perspective view illustrating coupling of a fixed end of a hand strap to a portable device.

As shown for example in FIGS. 6B and 7A-7B, it may be desired to provide the hand strap assembly 30 without the shoulder strap 10. In this embodiment, it may be desired to provide the strap catch 20 so that a user has the option of adding the shoulder strap 10, or removing it as desired. Or, as shown for example in FIGS. 1-2C, it may be desired to provide on the portable device 12 both the shoulder strap 10 and hand strap assembly 30. Provision of only the shoulder strap 10 on the portable device 12, without the hand strap assembly 30, may also be desired.

It should be understood, however, that the invention is not necessarily limited to the specific process, arrangement, materials, and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A portable device, comprising:
   a portable device body;
   a strap having a first strap end and a second strap end and being positioned diagonally across a surface of the portable device body, said first strap end being coupled to a first end of the portable device body at substantially a center portion thereof; and
   a removable strap attachment bracket attached at a second, opposite end of said portable device body so as to span a majority of a width of said portable device body, said strap attachment bracket having a first and a second distal end, and including a strap attachment at the first distal end that receives said second strap end of said strap, the strap attachment being located at one bracket end of said bracket, said strap attachment bracket being repeatedly removable by detachment and reattachment on said portable device body, and being selectively secured, using reusable means for fastening, to said portable device body to prevent said strap attachment bracket from moving relative to said portable device body, in a first orientation that positions and retains said first distal end and said strap attachment proximate a right side of said portable device body and said second distal end proximate a left side of said portable device body, or a second orientation that positions and retains said first distal end and said strap attachment proximate the left side of said portable device body and said second distal end proximate the right side of said portable device body, said strap attachment bracket being removed from said portable device body when switching said strap attachment bracket from the first orientation to the second orientation, and from the second orientation to the first orientation.

2. The portable device of claim 1 wherein a length of said strap is adjustable.

3. The portable device of claim 1 wherein the surface of said portable device body, which will contact a hand of a user when in position under said strap, is convex.

4. A method for carrying a portable device comprising steps of:
   providing the portable device of claim 1; and
   reversing said strap attachment bracket between an orientation positioning said attachment area proximate a right side of said portable device body and an orientation positioning said attachment area proximate a left side of said portable device body, by
   removing said strap attachment bracket and
   reattaching said strap attachment bracket.

5. The portable device of claim 1, wherein the portable device is selected from the group consisting of a hand-held computer, a PDA, a tablet computer, an item of photographic equipment, and an item of video equipment.

6. The portable device of claim 1, wherein said means for fastening comprises threaded fasteners that removably secure said strap attachment bracket to said portable device body.

7. The portable device of claim 1, wherein said means for fastening comprises plastic snap fasteners that removably secure said strap attachment bracket to said portable device body.

8. The portable device of claim 1 wherein said first end and said second end of said strap are positioned so that, in use, said strap crosses over a top portion of a user's hand in a line that is substantially parallel to the user's knuckles.

9. The portable device of claim 8 wherein said first end and said second end of said strap are positioned so that, in use, said user is permitted to maintain a relatively straight positioning of said user's wrist while grasping said portable device body.

10. The portable device of claim 1 further comprising:
    a shoulder strap having a padded region and a cord region;
    wherein said padded region is adapted to rest on a superior portion of a person's shoulder; and
    a shoulder strap catch adapted to be coupled at the first end of said portable device body;
    wherein said shoulder strap catch defines an opening therethrough;
    wherein said cord region is slidably retained within said opening so that said shoulder strap catch may be moved along said cord region without dislodging said padded region from said superior portion.

11. The portable device of claim 10 wherein said shoulder strap catch is rotatably coupled to said portable device body.

12. The portable device of claim 1, further comprising a cover positioned over said strap attachment bracket to cover the means for fastening when said strap attachment bracket is in position on said portable device body when said bracket is in either one of the left orientation and the right orientation, said cover including an open area that exposes the strap attachment.

13. The portable device of claim 12, wherein said bracket includes an open area through which the strap passes to the strap attachment bracket.

14. The portable device of claim 12, wherein said bracket cover snaps into position over the strap attachment bracket.

* * * * *